(12) United States Patent      (10) Patent No.: US 11,199,630 B2
Kassas et al.      (45) Date of Patent: Dec. 14, 2021

(54) INDOOR LOCALIZATION SYSTEM WITH LTE CODE AND CARRIER PHASE MEASUREMENTS AND AN IMU

(71) Applicant: The Regents of the University of California, Oakland, CA (US)

(72) Inventors: Zak Kassas, Irvine, CA (US); Ali Abdallah, Irvine, CA (US); Kimia Shamaei, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 17/039,843

(22) Filed: Sep. 30, 2020

(65) Prior Publication Data

US 2021/0109234 A1    Apr. 15, 2021

Related U.S. Application Data

(66) Substitute for application No. 62/913,078, filed on Oct. 9, 2019.

(51) Int. Cl.
*H04W 64/00*    (2009.01)
*G01S 19/43*    (2010.01)
(Continued)

(52) U.S. Cl.
CPC ............ *G01S 19/43* (2013.01); *H04L 5/0048* (2013.01); *H04W 56/0005* (2013.01); *H04W 64/003* (2013.01); *H04W 64/006* (2013.01)

(58) Field of Classification Search
CPC .............. H04W 64/00; H04W 64/003; H04W 64/006; H04W 56/00; H04W 56/0005;
(Continued)

(56) References Cited

U.S. PATENT DOCUMENTS

2009/0265104 A1* 10/2009 Shroff .................. G01C 21/165
                                                                     701/472
2014/0162686 A1* 6/2014 Lee ........................... G01S 5/10
                                                                     455/456.1
(Continued)

*Primary Examiner* — Siu M Lee
(74) *Attorney, Agent, or Firm* — Dinsmore & Shohl LLP; John P. Teresinski

(57) ABSTRACT

Systems, device configurations and methods are provided for indoor localization for a navigator receiver based on broadband communication signals such as LTE. In one embodiment, an LTE-IMU framework determines receiver position indoors. Two different designs of LTE receivers are provided based on code phase and carrier phase determinations of the received signal. A base/navigator framework is presented to correct unknown clock biases of the LTE eNodeBs. In this framework, the base receiver is placed outdoors, has knowledge of its own position, and makes pseudorange measurements to eNodeBs in the environment whose positions are known. The base transmits these pseudoranges to the indoor navigating receiver, which is also making pseudorange measurements to the same eNodeBs. The navigating receiver differences the base and navigator pseudoranges. The navigator receiver is equipped with an extended Kalman filter (EKF) to fuse LTE and IMU measurements in a tightly-coupled fashion and estimate navigating receiver states.

20 Claims, 11 Drawing Sheets

(51) Int. Cl.
*H04L 5/00* (2006.01)
*H04W 56/00* (2009.01)

(58) Field of Classification Search
CPC .... H04W 56/0035; G01S 19/04; G01S 19/05; G01S 19/06; G01S 19/07; G01S 19/073; G01S 19/10; G01S 19/13; G01S 19/14; G01S 19/25; G01S 19/38; G01S 19/39; G01S 19/43; G01S 19/45; G01S 19/46; G01S 19/47; H04L 5/0048
See application file for complete search history.

(56) References Cited

U.S. PATENT DOCUMENTS

| | | | |
|---|---|---|---|
| 2015/0201305 A1* | 7/2015 | Edge | H04W 4/02 455/456.3 |
| 2018/0227874 A1* | 8/2018 | Sirotkin | H04W 88/08 |
| 2018/0321353 A1* | 11/2018 | Patel | H04B 17/318 |

* cited by examiner

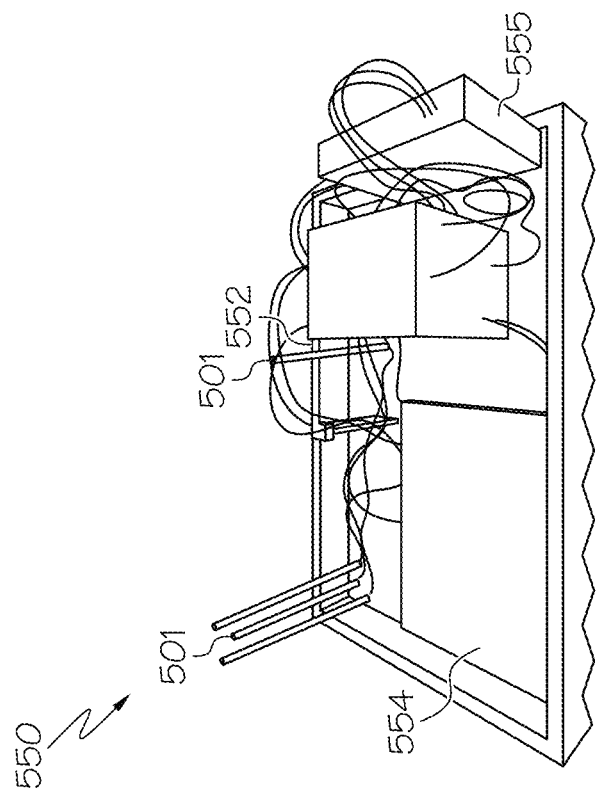
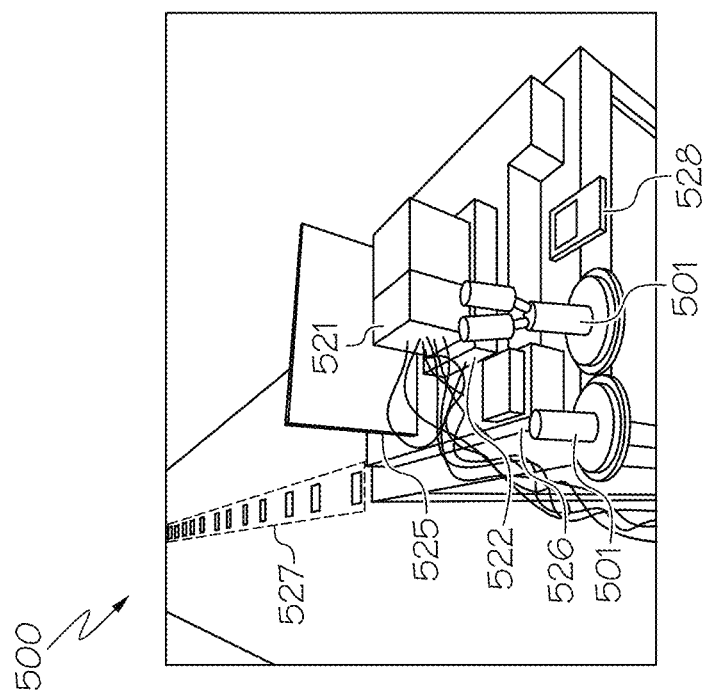

INDOOR LOCALIZATION SYSTEM WITH LTE CODE AND CARRIER PHASE MEASUREMENTS AND AN IMU

CROSS REFERENCE TO RELATED APPLICATION

This application claims priority to U.S. Provisional Application No. 62/913,078 titled INDOOR LOCALIZATION SYSTEM WITH LTE CODE AND CARRIER PHASE MEASUREMENTS AND AN IMU filed on Oct. 9, 2019, the content of which is expressly incorporated by reference in its entirety.

STATEMENT OF GOVERNMENT SUPPORT

This invention was made with Government support under Grant No. 70NANB17H192, awarded by the National Institute of Standards and Technology. The Government has certain rights in the invention.

FIELD

The present disclosure generally relates to a framework for locating a navigator receiver indoors, and specifically a framework capable of eliminating unknown LTE base station biases, such as an LTE-IMU framework and processes and device configurations for indoor localization based on received communication signals.

BACKGROUND

According to the U.S. Environmental Protection Agency, the average American spends 93% of their time indoors. This has dramatically increased the number of emergency calls originating indoors. This makes accurate indoor localization more important than ever especially for locating emergency callers and emergency responders when indoors.

Over the past decades, global navigation satellite systems (GNSS) have provided sufficiently accurate outdoor localization for many applications, e.g., surveying, transportation, aviation, etc. However, the received GNSS signals are highly attenuated indoors, which makes them practically unusable for indoor applications. GNSS signals, due to low bandwidth, are susceptible to multipath propagation, which severely affects the signals indoors.

Several approaches have been proposed to address the challenge of indoor localization, including visible light communication, active radio frequency identifications (RFIDs), ultra-wideband (UWB) signals, and using different sensors such as inertial measurements units (IMUs), LIDAR, and cameras. These approaches; however, can be impractical or of limited accuracy in emergency situations. Additional drawbacks include requiring pre-deployed infrastructure (e.g., in the case of UWB), improper operation in some emergency conditions (e.g., cameras in smoke), or the requirement of aiding sources, otherwise their solution will diverge over time (e.g., in the case of IMU).

Recent research has focused on exploiting signals of opportunity (SOPs) for navigation. SOPs are ambient radio frequency (RF) signals, which are not designed for navigation, but they are freely available in GNSS-challenged environments and can be exploited for navigation purposes. AM/FM, digital television, Wi-Fi, cellular, and low Earth orbit satellites are examples of SOPs. Wi-Fi signals are among the most studied signals for indoor positioning due to their abundance and high received power. Most existing approaches for WiFi positioning are based on received signal strength (RSS), which yields a coarse estimate of the position. However, in emergency situations, WiFi signals may be unavailable indoors. Moreover, the geometric diversity of WiFi access points may be poor, which limits their usefulness in time-of-arrival (TOA)-based approaches.

Cellular towers are abundant and available in favorable geometric configurations by construction of the cellular infrastructure. To use cellular signals for accurate positioning in indoor environments, two main challenges must be addressed. The first challenge is handling multipath-induced errors. In particular, short delay multipath is significantly high indoors, which introduces large errors in the code phase measurements. The second challenge is the unknown clock biases of the cellular transmitters (also known as evolved Node Bs or eNodeBs).

BRIEF SUMMARY OF THE EMBODIMENTS

The disclosure is directed to systems and processes for indoor localization for a navigator receiver. In one embodiment the method includes receiving, by a device, a broadband communication signal, and processing, by the device, the broadband communication signal based on a receiver framework to estimate range of the device relative to a source of the broadband communication signal. The method also includes receiving, by the device, position and psuedorange measurement data from a base receiver, and receiving, by the device, inertial measurement unit (IMU) measurement data associated with the device. The method also includes determining, by the device, a position for the device based on estimated range of the device relative to the source, difference in psuedorange measurement data relative to the base receiver, and IMU measurement data, wherein a filter of the device determines position based on a state vector for the device, a clock state vector and IMU state vector. The method includes outputting, by the device, a navigation observable based on the position determined for the device.

In one embodiment, the broadband communication signal is a cellular long term evolution (LTE) signal and wherein a cell-specific reference signal (CRS) of the broadband communication signal is tracked to estimate the range of the device.

In one embodiment, the range estimate is determined based on a code based receiver framework including an operations to perform a coarse estimate of frame start time, estimation of channel impulse response, estimation of time of arrival and tracking symbol timing within the frame of a received signal.

In one embodiment, the range estimate is determined based on a carrier-based receiver framework including operations to perform a coarse estimate of frame start time, estimation of doppler frequency of received signal, phase tracking of a cell-specific reference signal (CRS), and estimation of time of arrival.

In one embodiment, receiving position and psuedorange measurement data from a base receive includes receiving base position and base psuedorange measurements from a base device, wherein differences in psuedorange measurements are used by the device to remove clock bias from a received signal.

In one embodiment, receiving IMU data includes receiving angular rate around the z-axis and two-dimensional specific forces along x and y axes.

In one embodiment, determining position by the filter includes an operation to perform a discrete-time update of the clock state estimate for the device, wherein clock bias of the device is corrected.

In one embodiment, determining position by the filter includes updating a state vector for the device based on an extended Kalman filter (EKF) operation, the EKF filter operation updating the state vector to account for clock bias and the IMU state vector, and wherein EKF filter operation fuses IMU data with device measurements.

In one embodiment, an extended Kalman filter (EKF) operation is performed to estimate a state vector from carrier phase measurements.

In one embodiment, the navigation observable is a is at least one pseudorange measurement between a navigating receiver and a source of the broadband communication signal, wherein output of a navigation filter includes two-dimensional position and velocity of the device, and estimates of receiver clock bias and drift.

Another embodiment is directed to a device configured for indoor localization. The device includes a receiver module configured to receive a broadband communication signal, and a controller coupled to the receiver module. The controller is configured to process the broadband communication signal based on a receiver framework to estimate range of the device relative to a source of the broadband communication signal. The controller is also configured to receive position and psuedorange measurement data from a base receiver and receive inertial measurement unit (IMU) measurement data associated with the device. The controller is configured to determine a position for the device based on estimated range of the device relative to the source, difference in psuedorange measurement data relative to the base receiver, and IMU measurement data, wherein a filter of the device determines position based on a state vector for the device, a clock state vector and IMU state vector. The controller is configured to output a navigation observable based on the position determined for the device.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIG. 5A illustrates a navigator configuration according to one or more embodiments;

FIG. 5B illustrates a base configuration according to one or more embodiments;

DETAILED DESCRIPTION OF THE EXEMPLARY EMBODIMENTS

Overview and Terminology

Figure 1:
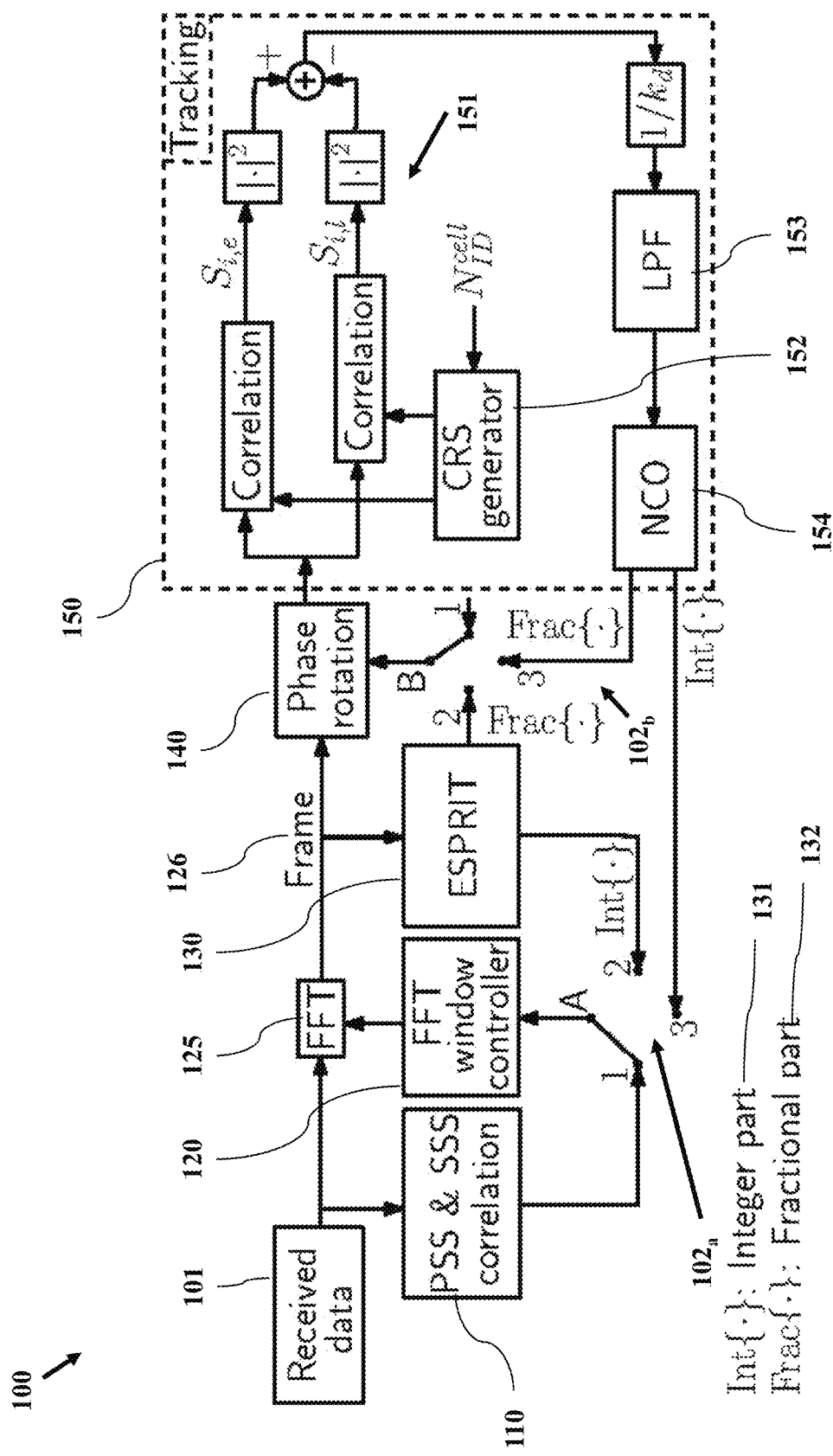
FIG. 1 is a graphical representation of a LTE code phase-based receiver framework according to one or more embodiments.

One aspect of the disclosure is directed to indoor localization based on broadband communication signals. In one embodiment, an LTE-IMU framework I s provided for locating a navigator receiver indoors, and specifically a framework capable of eliminating unknown LTE base station biases. Multiple receiver frameworks are provided to LTE receivers. In addition a base/receiver framework is provided including processes for localization. Configurations and processes are also provided for an LTE-IMU framework that allows for localization of a receiver in an indoor space based on receiver and IMU data.

Processes and configurations described herein are configured to utilize broadband communication signals, such as long term evolution (LTE) for the purpose of determining position of a receiver relative to at least one broadband transmitter. Cellular long term evolution (LTE) signals possess a large bandwidth (up to 20 MHz), which can be utilized with one or more embodiments herein for accurate TOA estimates. Availability f these signals is not hindered by emergency situations or use indoors (e.g., loss of power, fire, smoke, etc.). LTE signals also are characterized by high received power.

One or more embodiments are directed to a receiver configuration including a filter arrangement configured to extract positioning information from broadband communication signals and utilize sensor data, such as an inertial measurement unit (IMU) for indoor positioning. Embodiments may employ an extended Kalman filter (EKF) configuration resolve clock bias and couple receiver and IMU data for localization of a receiver.

The disclosure provides a base/navigator framework according to one or more embodiments. In one embodiment, the base/navigator framework acts as a substitute for the outdoor GNSS-aided INS in indoor environments. In one embodiment, LTE signals demonstrably have a very high received carrier-to-noise ratio (CNR) in different indoor conditions, which is 20-30 dB greater than that of GPS, outdoors. In one embodiment, the LTE signals are powerful enough to be used to produce navigation observables to aid an IMU. Hence, by using an appropriate specialized LTE receiver and navigation framework, the challenges of exploiting LTE signals for navigation may be overcome.

The disclosure also provides LTE receiver configurations and frameworks. According to one embodiment one or more LTE receiver configurations may be utilized for indoor navigation. In one embodiment, a code phase-based receiver is configured to provide an estimate of time of arrival of received broadband communication signal. According to another embodiment, a carrier phase-based receiver is provided to provide an estimate of time of arrival of received broadband communication signal. As provided herein, experimental results are discussed to compare these receivers using real LTE signals. In one embodiment, a base/navigator framework is presented to eliminate the unknown biases of LTE eNodeBs (evolved Node Bs). In this framework, the base receiver is placed outdoors, has knowledge of its own position, and makes pseudorange measurements to eNodeBs in the environment whose positions are known. In one embodiment, by using GNSS signals, the base can estimate its own position. In one embodiment, the base transmits these pseudoranges to an indoor navigating receiver, wherein the indoor navigating receiver is also making pseudorange measurements to the same eNodeBs. In one embodiment, the navigating receiver differences the base's and navigator's pseudoranges; hence, the unknown eNodeBs' biases are eliminated. In one embodiment, a tightly-coupled extended Kalman filter (EKF)-based LTE-IMU system is presented, wherein the LTE pseudoranges aid the IMU. The proposed navigation framework is evaluated in an experimental embodiment in an indoor trajectory of 109 m with a tactical-grade IMU and using 5 LTE base stations (also known as evolved Node Bs or eNodeBs). In one embodiment, the experimental results demonstrate a two-dimensional (2-D) position root mean squared-error (RMSE) of 2.92 m and a maximum error of 5.6 m.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Signal Model

LTE uses orthogonal frequency division multiplexing (OFDM) modulation. The transmitted data symbols in an LTE signal may be mapped onto multiple carrier frequencies called subcarriers, with a subcarrier spacing of $\Delta f$=15 kHz. The LTE downlink bandwidth can have different configurations as shown in Table I.

TABLE I

LIST OF POSSIBLE LTE DOWNLINK BANDWIDTH CONFIGURATIONS

| Bandwidth (MHz) | Total number of subcarriers | Number of subcarriers used |
|---|---|---|
| 1.4 | 128 | 72 |
| 3 | 256 | 180 |
| 5 | 512 | 300 |
| 10 | 1024 | 600 |
| 15 | 1536 | 900 |
| 20 | 2048 | 1200 |

In one embodiment, several reference signals can be exploited from LTE signals and used for navigation purposes including: (1) primary synchronization signal (PSS), (2) secondary synchronization signal (SSS), (3) positioning reference signal (PRS), and (4) cell-specific reference signals (CRS). In one embodiment, the PSS and SSS, which are transmitted to provide the frame start time and the eNodeB's cell ID to the user equipment (UE), have a fixed bandwidth of 0.93 MHz. The PRS was introduced in LTE release-9 to allow proper ranging measurements of the UE from LTE eNodeBs. In one embodiment, the CRS is mainly used for: (1) cell search and initial acquisition, (2) downlink channel quality measurements, and (3) downlink channel estimation for coherent demodulation/detection at the UE. In one embodiment, the CRS bandwidth is the same as the transmission bandwidth of the respective cell, which can be up to 20 MHz. According to one embodiment, the CRS may be used for range measurements, especially in multipath environments. In one embodiment, the CRS subcarrier allocation depends on the cell ID and the transmission antenna port. In one embodiment, the transmitted OFDM signal from the u-th eNodeB at the k-th subcarrier and on the i-th symbol can be expressed as $$Y_i^{(u)}(k) = \begin{cases} S_i^{(u)}(k), & \text{if } k = m\Delta_{CRS} + v_{i,N_{ID}^{Cell}}, \\ D_i^{(u)}(k), & \text{otherwise}, \end{cases} \quad (1)$$

where $S_i^{(u)}(k)$ represents the CRS sequence; m=0, ..., M−1; $M=\lfloor N_r/\Delta_{CRS} \rfloor$; $N_r$ is the number of subcarriers carrying the data;

$$\Delta_{CRS} = 6; v_{i,N_{ID}^{Cell}}$$

is a constant shift that depends on the cell ID; and $D_i^{(u)}(k)$ represents some other data signals.

Due to wireless channel effect and receiver imperfections, i.e., synchronization, clock drift, Doppler frequency, and/or carrier frequency offset, the estimated received signal deviates from the transmitted signals. One or more embodiments are configured to correct for signal mismatch. In one embodiment, in the presence of this mismatch, the received signal at the i-th symbol can be written as $$R_i(k) = \sqrt{C} e^{j\pi\epsilon_f} e^{j2\pi(iN_t+L_{CP})\epsilon_f/N_c} e^{j2\pi\epsilon_\theta k/N_c} Y_i(k) H_i(k) + W_i(k), k=0, \ldots, N_c-1,$$

where C is the received signal power; $N_t=N_c+L_{CP}$; $L_{CP}$ is the length of cyclic prefix (CP);

$$e_f = \frac{f_D}{\Delta f};$$

$f_D$ is the total carrier frequency offset due to clock drift, Doppler frequency, and oscillators' mismatch; $e_\theta = \hat{\theta} - \theta$ is the symbol timing error normalized by the sampling interval $$T_s = T_{symb}/N_c;\ T_{symb} = \frac{1}{\Delta f};$$

and $\hat{\theta}$ and $\theta$ are the normalized estimated and true symbol timings, respectively; $H_i(k)$ represents the channel frequency response; and $W_i(k) \sim \mathcal{CN}(0, \sigma^2)$, where $\mathcal{CN}(a, b)$ denotes the complex Gaussian distribution with mean a and variance b.

LTE Receiver Structures

One or more embodiments are directed to LTE receiver configurations or frameworks. LTE receivers described herein may be configured to determine time of arrival estimates for received communication signals. As described in FIG. 1, an LTE receiver may be configured as a code phase-based receiver 100 according to one embodiment. As described in FIG. 2, a LTE receive may be configured as a carrier phase-based receiver 200 according to another embodiment.

LTE Code Phase-Based Receiver

FIG. 1 is a graphical representation of a LTE code phase-based receiver framework according to one or more embodiments. According to one embodiment, receiver 100 is an LTE code phase-based receiver. Including OFDM-based delay-locked loop (DLL) 150. DLL 150 may be configured to track the code phase of a CRS in a received signal. Receiver 100 may be configured to receive a broadband communication signal at block 101, such as an LTE signal. In one embodiment, the receiver 100 has three main stages, where in each stage nodes A (shown as 102$_a$) and B (shown as 102$_b$) are connected to their respective nodes 1, 2, or 3.

In one embodiment, in the first stage, where nodes A and B (shown as 102$_{a-b}$) are connected to their respective node 1, a coarse estimate of the frame start time is obtained by acquiring the PSS and SSS at block 110. Then, in one embodiment, the frame start time is used by an FFT window controller at block 120 to control window timing of fast Fourier transform (FFT) at block 125. In one embodiment, the cyclic prefix (CP) elements are removed and an FFT is taken at block 125 to convert the received signal into an LTE frame structure 126.

In one embodiment, in the second stage, where nodes A and B (shown as 102$_{a-b}$) are connected to their respective node 2, the channel impulse response is estimated using the estimation of signal parameters by a rotational invariance techniques (ESPRIT) algorithm at block 130. In one embodiment, the estimated time-of-arrival (TOA) corresponding to the first path represents the line-of-sight (LOS) TOA and is used to refine the frame timing estimation. Then, in one embodiment, the integer part, shown as 131, of the estimated TOA is used by the FFT window controller at block 120 to refine the window timing for the FFT at block 125 and the fractional part, shown as 132, is removed by a phase rotation operation at block 140 in the frequency domain.

In one embodiment, in the third stage (i.e., the tracking stage), a DLL 150 is used to track the symbol timing within one or more frames of the received signal. In a conventional DLL discriminator function (e.g., dot-product), correlation of the time-domain received signal with the locally generated early, late, and prompt replica of the signal is used to estimate the TOA error. However, the CRS is scattered in bandwidth, which makes it impractical to obtain its time-equivalent form. Hence, in one or more embodiments, a specialized DLL 150 designed specifically for OFDM systems is used to track the CRS in LTE signals. In this DLL 150, the time-domain shift may be represented as a phase rotation at block 140 in the frequency-domain and the early and late correlations are obtained accordingly. Denoting the early and late correlations of the i-th received symbol with the locally generated CRS signal at block 152 by $S_{i,e}$ and $S_{i,l}$, respectively, the DLL 150 discriminator function can be defined as $$D_i \triangleq |S_{i,e}|^2 - |S_{i,l}|^2 \triangleq M^2 C S_d(\tilde{e}_\theta, \xi) + N_{DLL}$$

where $\xi$ is the correlator spacing, $S_d(\tilde{e}_\theta, \xi)$ is the normalized S-curve function, and $N_{DLL}$ is the noise component of the discriminator function. For small values of timing error, the discriminator function can be approximated by a linear function of the error with slope $k_d$. Therefore, in one embodiment, normalizing the output of the discriminator function by $k_d$ and passing it through a low-pass filter (LPF) at block 153 and numerically controlled oscillator 154 to provide an estimate of the timing error, which can be integrated to provide a refined estimate of the TOA.

LTE Carrier Phase-Based Receiver

Figure 2:
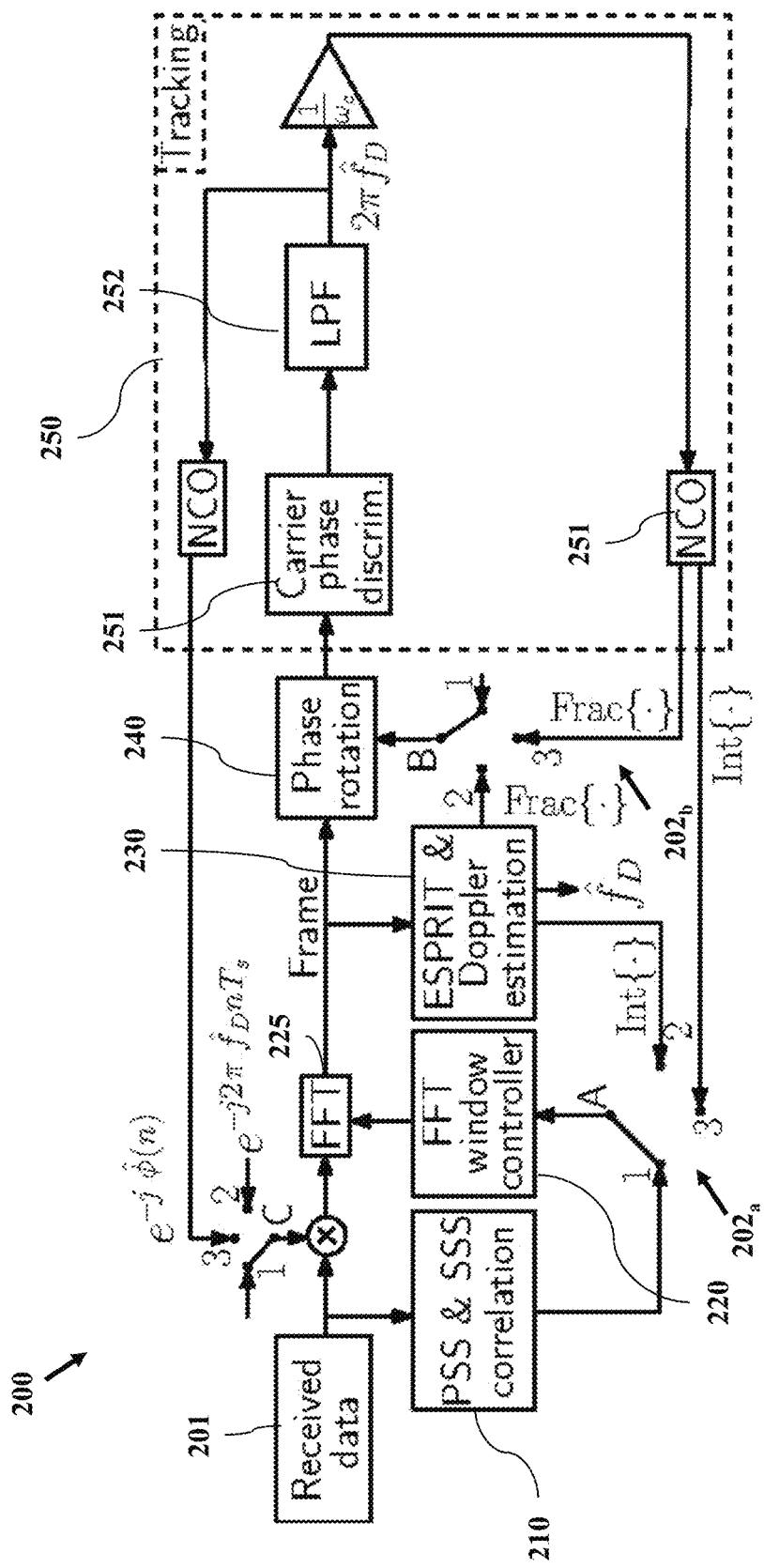
FIG. 2 is a graphical representation of a LTE carrier phase-based receiver framework according to one or more embodiments.

FIG. 2 is a graphical representation of a LTE carrier phase-based receiver framework according to one or more embodiments. LTE carrier phase-based receiver 200 includes phase-locked loop (PLL) 250 configured to track the phase of a CRS in a received signal. Similar to the code phase-based receiver 100 of FIG. 1, the carrier-phase based receiver 200 has three stages, where in each stage nodes A, B (shown as 202$_{a-b}$) are connected to their respective nodes 1, 2, and 3, respectively. One embodiment of the first stage has common structure to the one discussed for the code phase-based receiver of FIG. 1. By way of example, a coarse estimate of the frame start time is obtained by acquiring the PSS and SSS at block 210. Then, in one embodiment, the frame start time is used by an FFT window controller at block 220 to control window timing of fast Fourier transform (FFT) at block 225. In one embodiment, in the second stage, along with the ESPRIT algorithm at clock 230, an initial estimate of the Doppler frequency is obtained (estimated) by defining z(m) as $$z(m) = R_{i+7}(k)R_i^*(k)S_{i+7}^*(k)S_i(k) = Ce^{j2\pi 7 N_t e_f/N_c}|H_i(k)|^2 + W'(k),\quad (2)$$

$$\text{for } k = m\Delta_{CRS} + v_{i,N_{ID}^{Cell}},\ m = 0, \cdots, M-1.$$

The above is obtained by assuming that the channel frequency response stays constant over one slot duration (i.e., 0.5 ms). Then, the initial Doppler frequency is estimated as $$\hat{f}_D = \frac{1}{2\pi T_{slot}}\Delta\varphi,\quad (3)$$

-continued $$\Delta \varphi \triangleq arg\left[\sum_{m=0}^{M-1} z(m)\right]. \quad (4)$$

In one embodiment, the initial Doppler estimate is removed from the received signal by a phase rotation on the time-domain received signal as $$r(n) \leftarrow e^{-j2\pi \hat{y}_D nT_s} r(n),$$

where r(n) is the received signal in the time-domain.

In one embodiment, in the third stage, where nodes A, B, and C are connected to their respective node 3, the receiver tracks the phase of the received signal and produces a fine estimate of the TOA using PLL 250. In one embodiment, the carrier phase discriminator function at block 251 of the PLL 250 can be defined as $$D_{PLL} = arg\left[\sum_{m=0}^{M-1} R'(k)S^*(k)\right],$$

for $k = m\Delta_{CRS} + v_{i,N_{ID}^{Cell}}, m = 0, \cdots, M-1,$ where R'(k) is the frequency-domain received signal after removing the TOA and Doppler frequency estimate.

In one embodiment, a second-order loop filter at block 252 at the output of the discriminator function 251 can be applied to result in the rate of change of the carrier phase error $2\pi \hat{f}_D$ expressed in rad/s. By normalizing the results by angular carrier frequency $\omega_c$, the rate of change of TOA can be obtained by PLL 250. Then, an integrator can be used to refine the estimate of TOA.

Indoor Navigation Framework

According to one embodiment, a base/navigator navigation framework is presented. In this framework, LTE navigation observables are tightly coupled with IMU measurements using an EKF.

Base/Navigator Framework

Figure 3:
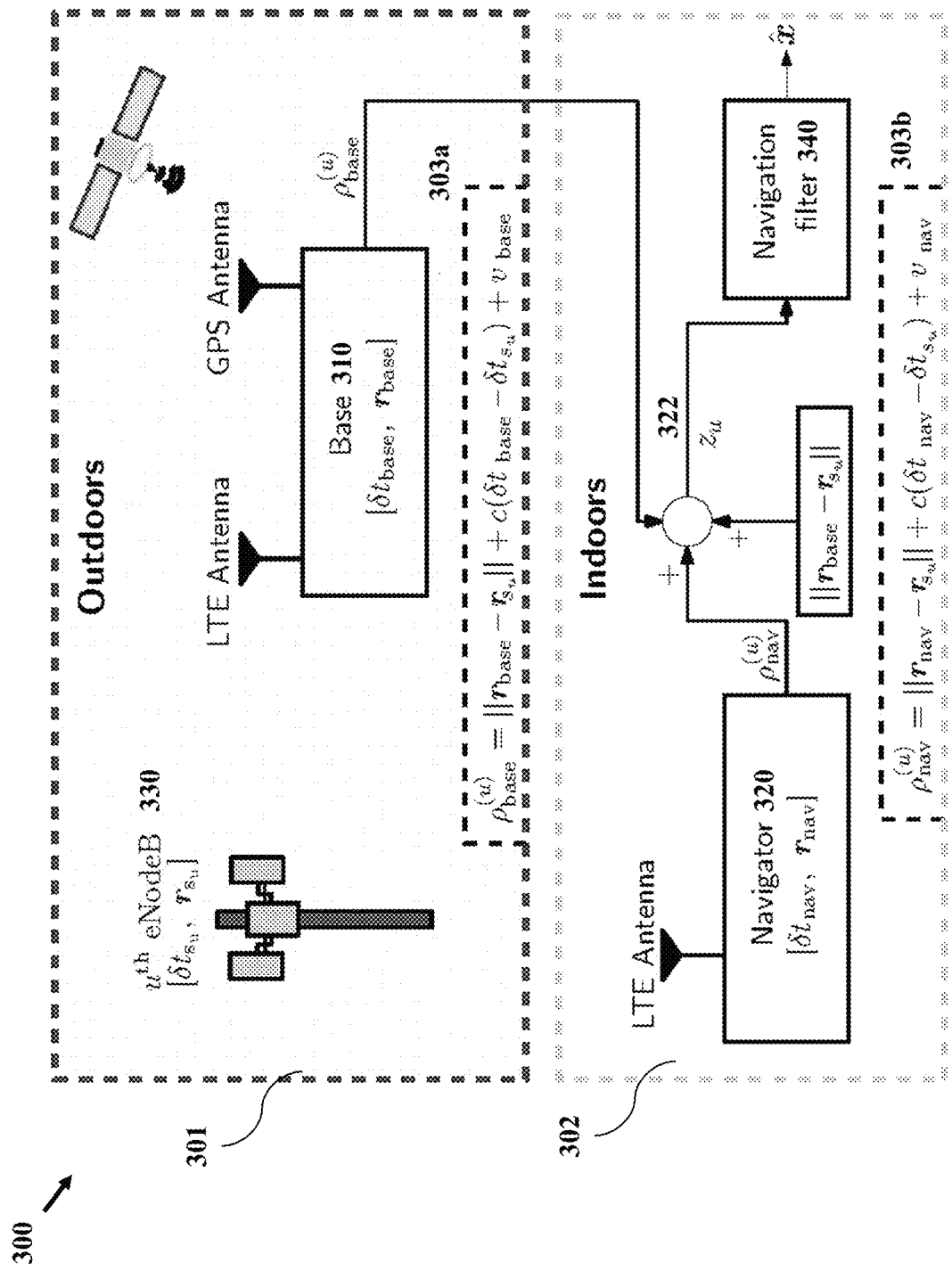
FIG. 3 illustrates a base/navigator framework according to one or more embodiment.

One of the main challenges in navigation with LTE signals is the unknown clock biases of the LTE eNodeBs by the receiver. In this subsection, a base/navigator framework is provided to address this challenge. FIG. 3 illustrates a base/navigator framework according to one or more embodiments. According to one embodiment, a base/receiver framework 300 includes outdoor components shown generally as 301 and indoor components shown generally as 302. According to one embodiment, outdoor components 301 may be configured to reconcile received positioning measurements, such as GPS (GNSS) with observables received from an LTE antenna. Accordingly, base or receiver 310, receives LTE communication signals transmitted by antenna 330 using an LTE antenna, and global positioning data from a satellite or other source. Navigator or receiver 320 can receive LTE communication signals from an LTE antenna, including communications from the same transmitted antenna 330.

Base/navigator framework 300 includes an LTE base receiver 310 placed outdoors. The base receiver 310 can be mounted to a vehicle, such as a fire truck or a police car, and can estimate its own position from GNSS signals. The base receiver 310 installation may be a one-time process that can be done prior to the emergency situation where the framework 300 may be called upon. In one embodiment, the indoor navigator (e.g., emergency responder) is also equipped with an LTE receiver, such as receiver 320. In one embodiment, the objective of the framework 300 is to estimate the position ($r_{nav}$) of a navigator receiver, such as receiver 320.

According to one embodiment, a localization process may be performed based on base receiver and navigator receiver measurements. In one embodiment, during the localization process, both receiver 310 and receiver 320 make pseudorange measurements to the same LTE eNodeBs, such as transmitter antenna 330, located at $\{r_{s_u}\}_{u=1}^U$, where U is the total number of eNodeBs in the environment. In one embodiment, pseudorange measurements (shown as 303a-b) of the receiver 310 and receiver 320 to the u-th eNodeB, such as transmitter antenna 330, are denoted by $\rho_{base}^{(u)}$ and $\rho_{nav}^{(u)}$, respectively. In one embodiment, the receiver 310 transmits its position and pseudorange measurements 303a to receiver 320 wirelessly. In one embodiment, receiver 320 differences its pseudorange estimates 303b with the data received from the receiver 310 to remove unknown common term of the clock biases of the eNodeBs as shown in FIG. 3. The resulting measurements $z \triangleq [z_1, \ldots, z_U]^T$, shown as 322, are fed to the navigation filter 340 to estimate the state vector $\hat{x}$ of receiver 320.

LTE IMU Tight Coupling Integration

Figure 4A:
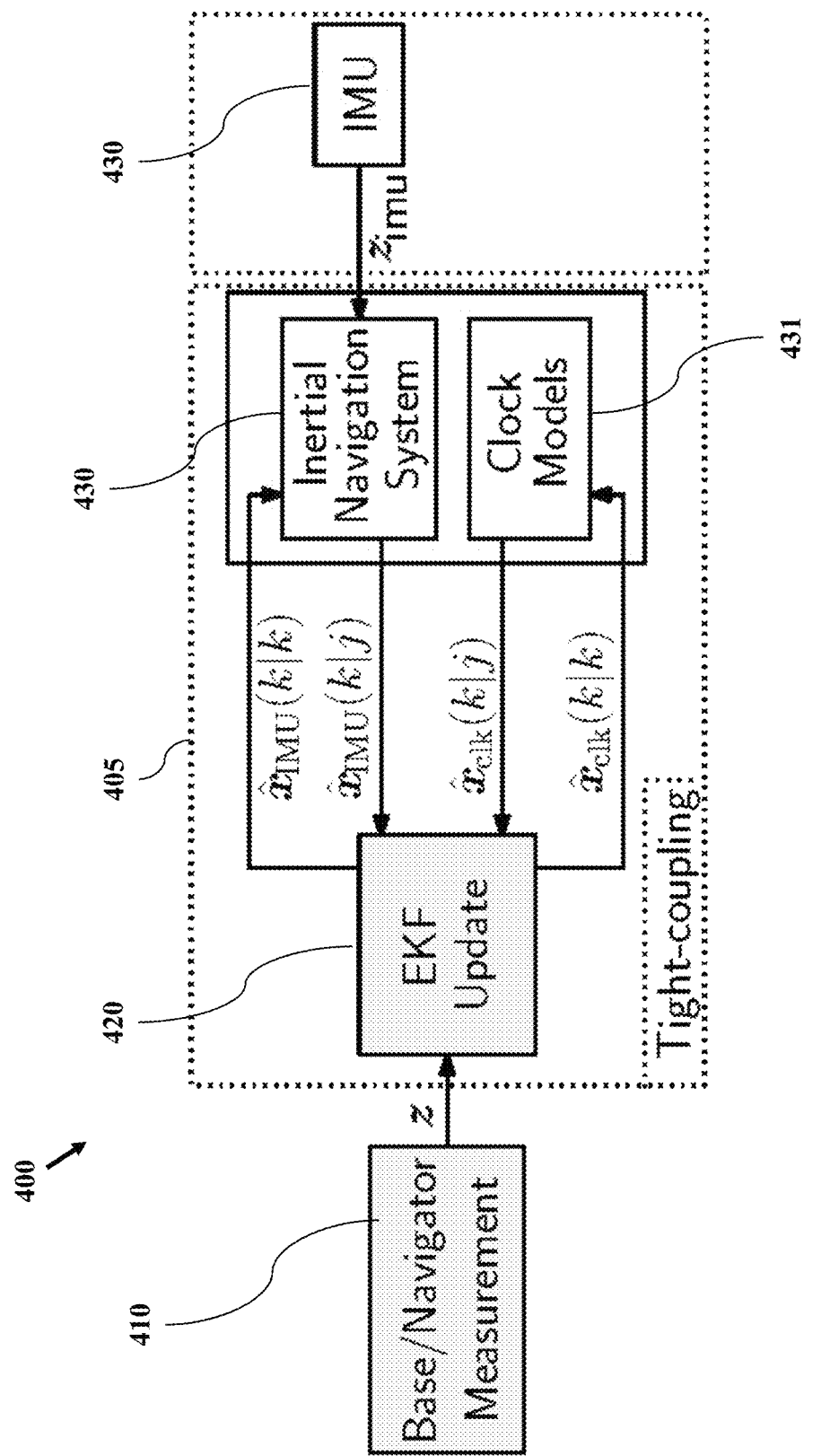
FIG. 4A is a block diagram of a LTE-IMU system according to one or more embodiments.

According to one embodiment, LTE estimates may be fused with sensor data, such as that of an inertial measurement unit (IMU). The IMU may be associated or located with the position of an indoor navigator receiver for the purpose of localizing (determining position) of the navigator receiver. FIG. 4A is a block diagram of a LTE-IMU system according to one or more embodiments. LTE-IMU system 400 includes device 405 configured to receive base/navigator measurement data 410 and IMU data from IMU 430. In one embodiment, device 405 may be a navigator receiver or a component of a navigator receiver such as receiver 320. Device 405 may be equipped and/or interoperate with a barometer and an IMU. In one embodiment, device 405 includes a filter, such as extended Kalman filter EKF at block 420, configured to fuse the IMU measurements at block 430 with the base/navigator measurements (z) at block 410 in a tightly-coupled fashion. In one embodiment, a barometer is used to estimate the navigator's altitude. According to another embodiment, an EKF at block 420 is configured to estimate a 2-D position of the navigator, such as receiver 320.

1) EKF State and Dynamic Model: In one embodiment, the navigator receiver (e.g., receiver 320) state vector x is defined as $$x = [x_{IMU}^T, x_{clk}^T]^T$$

where $x_{IMU}$ and $x_{clk}$ are the IMU and clock state vectors, respectively.

In one embodiment, the IMU state vector is defined as $$x_{IMU} \triangleq [\theta_z, r^T, \dot{r}^T, b_a^T, b_{gz}]^T$$

where $\theta_z$ is the orientation, $\dot{r}$ is the 2-D velocity, and r is the 2-D position of the IMU; $b_a$ represents the biases in the two accelerometers (x- and y-axes); and $b_{gz}$ is the gyroscope's bias (around z-axis). The IMU state vector may be provided by inertial navigation system at block 430 to the filter block 420.

The clock state vector for the base/navigator framework at block 410 may be defined as $$x_{clk} \triangleq x_{clk_{nav}} - x_{clk_{base}} = [c\Delta\delta t, c\Delta\dot{\delta t}]^T,$$

where $\Delta \delta t \triangleq \delta t_{nav} - \delta t_{base}$; $\delta t_{nav}$ and $\delta t_{base}$ are the clock biases of the navigator receiver 320 and base receiver 310, respectively; $\Delta \dot{\delta t} \triangleq \dot{\delta t}_{nav} - \dot{\delta t}_{base}$; $\dot{\delta t}_{nav}$ and $\dot{\delta t}_{base}$ are clock drifts of the navigator receiver 320 and base receiver 310, respectively. The clock state vector may be provided by clock models at block 431 to the filter block 420.

The clock state vector $x_{clk}$ evolves according to $$x_{clk}(k+1) = F_{clk}(k)x_{clk}(k) + w_{clk}(k), F_{clk} \triangleq \begin{bmatrix} 1 & T \\ 0 & 1 \end{bmatrix},$$

where T is the sampling interval and $w_{clk}$ is the process noise, which is modeled as a discrete-time zero-mean white sequence with covariance $Q_{clk}$ given by $$Q_{clk} \triangleq Q_{clk_{nav}} + Q_{clk_{base}},$$

$$Q_{clk_i} \triangleq \begin{bmatrix} S_{\tilde{w}_{\delta t,i}}T + S_{\tilde{w}_{\delta t,i}}\frac{T^3}{3} & S_{\tilde{w}_{\delta t,i}}\frac{T^2}{2} \\ S_{\tilde{w}_{\delta t,i}}\frac{T^2}{2} & S_{\tilde{w}_{\delta t,i}}T \end{bmatrix},$$

where $i \in \{nav, base\}$, and $S_{\tilde{w}_{\delta t,i}}$ and $S_{\tilde{w}_{\delta t,i}}$ are the clock bias and drift process noise power spectra, respectively. In one embodiment, the values of $S_{\tilde{w}_{\delta t,i}}$ and $S_{\tilde{w}_{\delta t,i}}$ depend on the clock's quality.

2) EKF Time Update: In one embodiment, at time step k, the EKF at block 420 produces an estimate of the state vector $\hat{x}(k|j) \triangleq \mathbb{E}[x(k)|Z^j]$ along with an estimation error covariance $P(k|j) \triangleq \mathbb{E}[\tilde{x}(k|j)\tilde{x}^T(k|j)]$, where $k \geq j$; $Z^j \triangleq \{z(l)\}_{l=1}^j$; and $\tilde{x}(k|j) \triangleq x(k) - \hat{x}(k|j)$ is the estimation error.

In one embodiment, the state estimate $\hat{x}(k|j)$ can be written as $$\hat{x}(k|j) = [\hat{x}_{IMU}^T(k|j), \hat{x}_{clk}^T(k|j)]^T. \tag{5}$$

In one embodiment, the evolution of $b_{gz}$ and $b_a$ are modeled as random walk processes, i.e. $\dot{b}_{gz} = w_{gz}$ and $\dot{b}_a = w_a$ with $\mathbb{E}[w_{gz}] = 0$, $\mathbb{E}[w_a] = 0$, $\text{cov}[w_{gz}] = \sigma_{w_{gz}}^2$, and $\text{cov}[w_a] = \sigma_{w_a}^2 I_{2 \times 2}$. In one embodiment, the discrete-time update of the IMU states can be calculated via Euler integration as:

$$\hat{\theta}_z(k+1|j) = \hat{\theta}_z(k|j) + T(\hat{\dot{\theta}}_z(k|j) - \hat{b}_{gz}(k|j)),$$

$$\hat{r}(k+1|j) = \hat{r}(k|j) + \Delta \hat{r},$$

$$\hat{\dot{r}}(k+1|j) = \hat{\dot{r}}(k|j) + T\hat{\ddot{r}}(k|j),$$

$$\hat{b}_{gz}(k+1|j) = \hat{b}_{gz}(k|j),$$

$$\hat{b}_a(k+1|j) = \hat{b}_a(k|j),$$

where $\dot{\theta}_z$ is the angular rate around z-axis; T is the IMU sampling interval; $\Delta\hat{r} = TR^T(\hat{\theta}_z(k|j))[\hat{\dot{r}}(k|j) - \hat{b}_a(k|j)]$; $\ddot{r}$ is the acceleration along x- and y-axes; $z_{imu} \triangleq [\hat{\theta}_{z_{imu}}, a_{imu}^T]^T$ is the IMU measurement vector; $R(\theta_z)$ is the rotation matrix representing the orientation of the body frame with respect to the global frame and is defined as $$R(\theta_z) \triangleq \begin{bmatrix} \cos\theta_z & \sin\theta_z \\ -\sin\theta_z & \cos\theta_z \end{bmatrix}.$$

In one embodiment, the discrete-time update of the clock state estimate is given by $$\hat{x}_{clk}(k+1|j) = F_{clk}\hat{x}_{clk}(k|j), \tag{6}$$

In one embodiment, the prediction error covariance matrix is given by $$P(k+1|j) = FP(k|j)F^T + Q_d, \tag{7}$$

where $F \triangleq \text{diag}[F_{IMU}, F_{clk}]$; $Q_d = \text{diag}[Q_{IMU}, Q_{clk}]$; $F_{IMU}$ is the linearized discrete-time IMU state transition matrix given by $$F_{IMU} = \begin{bmatrix} 1 & 0_{1\times 2} & 0_{1\times 2} & 0_{1\times 2} & T \\ \hat{S}(k|j) & I_{2\times 2} & 0_{2\times 2} & TR(\theta_Z(k|j)) & 0_{2\times 1} \\ 0_{2\times 1} & TI_{2\times 2} & I_{2\times 2} & 0_{2\times 2} & 0_{2\times 2} \\ 0_{2\times 1} & 0_{2\times 2} & 0_{2\times 2} & I_{2\times 2} & 0_{2\times 2} \\ 0 & 0_{1\times 2} & 0_{1\times 2} & 0_{1\times 2} & 1 \end{bmatrix},$$

$$\hat{S}(k|j) \triangleq JR[\hat{\theta}_Z(k|j)](\hat{\dot{r}}_{IMU}(k|j) + \hat{b}_a(k|j)),$$

with $$J = \begin{bmatrix} 0 & 1 \\ -1 & 0 \end{bmatrix}; Q_{IMU}$$

with is the linearized discrete-time IMU state process noise covariance matrix given by $$Q_{IMU} = \frac{T}{2}F_{IMU}^T N_C F_{IMU} + N_c,$$

where $N_c \triangleq \Gamma Q_c \Gamma^T$; $Q_c$ is the continuous-time IMU process noise covariance matrix defined as $$Q_c = \text{diag}[\sigma_{gz}^2, \sigma_a^2 I_2, \sigma_{w_{gz}}^2, \sigma_{w_a}^2 I_2];$$

and $\Gamma$ is the error-state transition matrix defined as $$\Gamma = \begin{bmatrix} 1 & 0_{1\times 2} & 0_{1\times 3} \\ 0_{2\times 1} & R[\hat{\theta}_Z(k|j)] & 0_{2\times 3} \\ 0_{2\times 1} & 0_{2\times 2} & 0_{2\times 3} \\ 0_{3\times 1} & 0_{3\times 2} & I_{3\times 3} \end{bmatrix}.$$

3) EKF Measurement Update: In one embodiment, once the EKF at block 420 receives the base/navigator measurement vector z, the filter performs a measurement update according to $$\hat{x}(k+1|k+1) = \hat{x}(k+1|j) + K(k+1)v(k+1), \tag{8}$$

where v and K are the innovation vector and Kalman gain, respectively, given by $$v \triangleq z - \hat{z},$$

$$\hat{z}_u \triangleq \|\hat{r}(k+1|j) - r_{s_u}\|_2 + c\Delta\hat{\delta t}(k+1|j),$$

$$K(k+1) \triangleq P(k+1|j)H^T(k+1)S^{-1}(k+1),$$

$$S(k+1) \triangleq H(k+1)P(k+1|j)H(k+1)^T + R_n(k+1),$$

where $u = 1, \ldots, U$ and $R_n$ is the measurement noise covariance matrix given by $R_n = \text{diag}[\sigma_{nav_1}^2 + \sigma_{base_1}^2, \ldots, \sigma_{nav_U}^2 + \sigma_{base_U}^2]$ and H is the Jacobian matrix defined as $$H(k+1) = \begin{bmatrix} H^{(1)}(k+1) \\ \vdots \\ H^{(U)}(k+1) \end{bmatrix},$$

-continued $$H^{(U)}(k+1) = \left[ 0_{1\times 3}, \frac{[\hat{r}_u(k+1|j) - r_{s_u}^u]^T}{\|\hat{r}_u(k+1|j) - r_{s_u}^u\|_2}, 0_{1\times 3}, 1, 0 \right].$$

In one embodiment, the estimation error covariance matrix is updated according to $$P(k+1|k+1) = [I - K(k+1)H]P(k+1|j).$$

Note that the LTE navigator receiver (e.g., receiver 320) position was assumed in this embodiment to be identical to the IMU's position, i.e., $r_{nav} = r$.

Figure 4C:
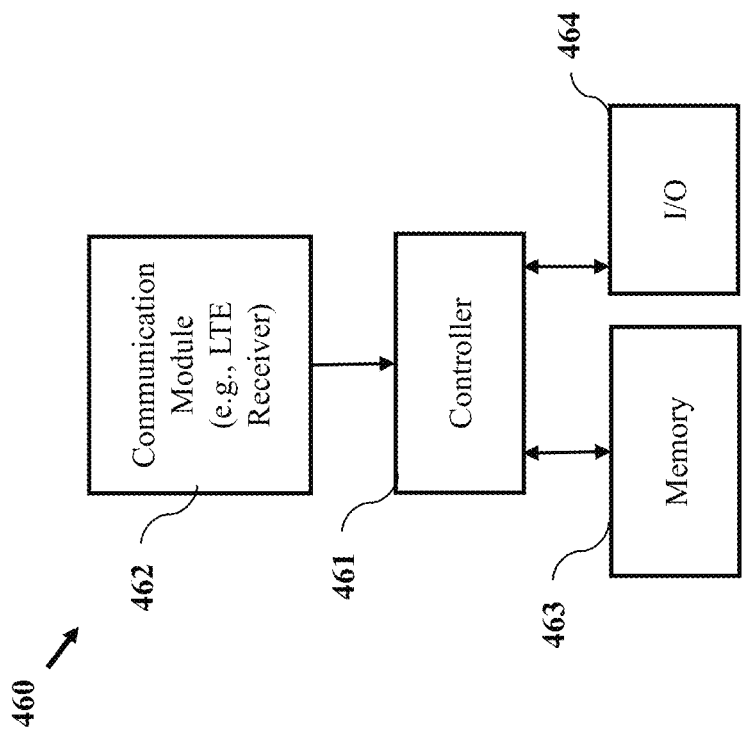
FIG. 4C is a device configuration according to one or more embodiments.
Figure 4B:
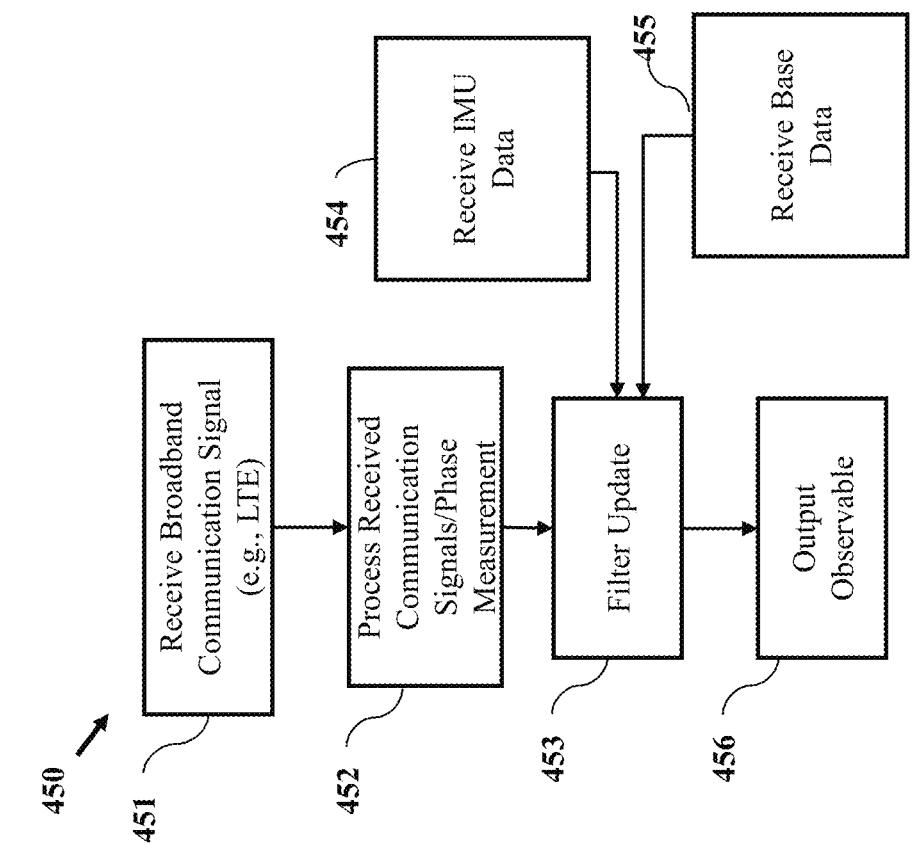
FIG. 4B illustrates a process for indoor localization for a navigator receiver according to one or more embodiments.

FIG. 4B illustrates a process for indoor localization for a navigator receiver according to one or more embodiments. According to one embodiment, process 450 may be performed by a device, such as device 405. Process 450 may operate using one or more frameworks and devices described herein.

Process 450 may be initiated by device, such as device 405, receiving a broadband communication signal at block 451. The broadband communication signal may be a cellular long term evolution (LTE) signal. According to one embodiment, a cell-specific reference signal (CRS) of the broadband communication signal is tracked to estimate the range of the device. IN certain embodiments, the broadband communication signal is received by indoor components (e.g., indoor components 302) such as a base/receiver framework.

At block 452, process 450 performs processing of the broadband communication signal based on a receiver framework to estimate range of the device relative to a source of the broadband communication signal. Each of the base and navigator receivers may perform pseudorange measurements to estimate TOA to a transmitting antenna using one or more of a code-phased based and carrier phase-based receiver configuration. According to one embodiment, the range estimate is determined based on a code based receiver framework including an operations to perform a coarse estimate of frame start time, estimation of channel impulse response, estimation of time of arrival and tracking symbol timing within the frame of a received signal. According to another embodiment, the range estimate is determined based on a carrier-based receiver framework including operations to perform a coarse estimate of frame start time, estimation of doppler frequency of received signal, phase tracking of a cell-specific reference signal (CRS), and estimation of time of arrival.

At block 454, process 450 includes receiving inertial measurement unit (IMU) measurement data associated with the device. IMU data received can include one or more of orientation, two-dimensional velocity and two-dimensional position of the IMU. In certain embodiments, IMU data received can include angular rate around the z-axis and two-dimensional specific forces along x and y axes.

At block 455, process 450 includes receiving position and psuedorange measurement data from a base receiver. Receiving position and psuedorange measurement data from a base receive can include receiving base position and base psuedorange measurements from a base device, wherein differences in psuedorange measurements are used by the device to remove clock bias from a received signal.

At block 453, process 450 performs determining, by the device, a position for the device based on estimated range of the device relative to the source, difference in psuedorange measurement data relative to the base receiver, and IMU measurement data, wherein a filter of the device determines position based on a state vector for the device, a clock state vector and IMU state vector. According to one embodiment, determining position by the filter includes an operation to perform a discrete-time update of the clock state estimate for the device, wherein clock bias of the device is corrected. According to one embodiment, determining position by the filter includes updating a state vector for the device based on an extended Kalman filter (EKF) operation, the EKF filter operation updating the state vector to account for clock bias and the IMU state vector, and wherein EKF filter operation fuses IMU data with device measurements. An extended Kalman filter operation is performed to estimate a state vector from carrier phase measurements.

At block 456, process 450 performs outputting, by the device, a navigation observable based on the position determined for the device. The navigation observable may be a two-dimensional position of the device. According to another embodiment, the navigation observable is at least one pseudorange measurement between a navigating receiver and a source of the broadband communication signal, wherein output of a navigation filter includes two-dimensional position and velocity of the device, and estimates of receiver clock bias and drift FIG. 4C is a device configuration according to one or more embodiments. FIG. 4C illustrates a device configuration for an indoor localization system. According to one embodiment, device 460 may include controller 461, communications module 462, memory 463, and input/output (I/O) unit 464.

Controller 461 may relate to a processor or control device configured to execute one or more operations stored in memory 463, such as a coupled LTE-IMU framework. Controller 461 may be coupled to memory 463, I/O 464 and communication module 462. Communications module 463 may be configured to receive one or more broadband communication signals from one or more antennas including LTE signals and may receive one or more signals from a base receiver. I/O 464 may be configured to receive one or more IMU measurements.

Communications module 462 may be configured to receive a broadband communication signal from an antenna of an LTE transmitter. Controller 461 may be configured to process the broadband communication signal based on a receiver framework to estimate range of the device relative to a source of the broadband communication signal, receive position and psuedorange measurement data from a base receiver and receive inertial measurement unit (IMU) measurement data associated with the device. Controller 461 may be configured to determine a position for the device based on estimated range of the device relative to the source, difference in psuedorange measurement data relative to the base receiver, and IMU measurement data, wherein a filter of the device determines position based on a state vector for the device, a clock state vector and IMU state vector. Controller 461 may be configured to output a navigation observable based on the position determined for the device.

Experimental Results

The disclosure includes results of evaluations directed to performance of receiver and base/navigator frameworks (e.g., framework 300) discussed herein. Results include an experiment conducted in an indoor environment: Winston Chung Hall building at the University of California, Riverside. Performance results of the code phase-based receiver 100 and carrier phase-based receiver 200 are provided. Similarly, performance of the tightly-coupled LTE-IMU system (e.g., system 400) are also discussed.

Experimental Setup

FIG. 5A illustrates a navigator configuration according to one or more embodiments. FIG. 5B illustrates a base configuration according to one or more embodiments. According to one embodiment, a navigator configuration 500 can include omni directional antennas 501, software defined radio peripherals 521 and 522, computer 525 and an IMU 526. Several tags 527 were placed at known locations on the ground before performing the experiment. Over the course of the experiment, a smart phone camera 528 was used to record the location of the navigator using the tags 527 on the ground, which were later used as the ground truth.

According the experiment, navigator configuration 500 included a hardware setup, similar to a base configuration except for the USRP configurations, which were a dual-channel USRP-2954R software defined radio peripherals and two USRPs-2920 software defined radio peripherals. The USRPs at receiver 500 simultaneously down-mixed and synchronously sampled LTE signals at 20 Msps. The navigator receiver 500 was equipped with a tactical-grade IMU (Septentrio AsteRx-i V). The signals were processed in a post-processing fashion using MATLAB on a computing device.

In one experimental embodiment, the LTE base receiver 550 was placed on the roof of the building, while the LTE navigator receiver 500 was placed indoors. In one embodiment, the base receiver 550 and navigator receiver 500 were equipped with four consumer-grade cellular omnidirectional antennas 501 to collect LTE data at four different carrier frequencies. In one embodiment, these frequencies corresponded to three U.S. LTE cellular providers: T-Mobile, Verizon, and AT&T (note that two of the carrier frequencies were being used by the same provider). In one embodiment, the base 550 used three single-channel National Instruments (NI) universal software radio peripherals (USRPs)-2920 552 to simultaneously down-mix and synchronously sample LTE signals at 10 Msps (Mega samples per second (e.g., millions of samples per second)). The signals were recorded on a laptop 554, which was connected to the USRPs through an Ethernet cable. The location of base receiver 550 location was estimated using a GPS receiver 555.

Figure 6:
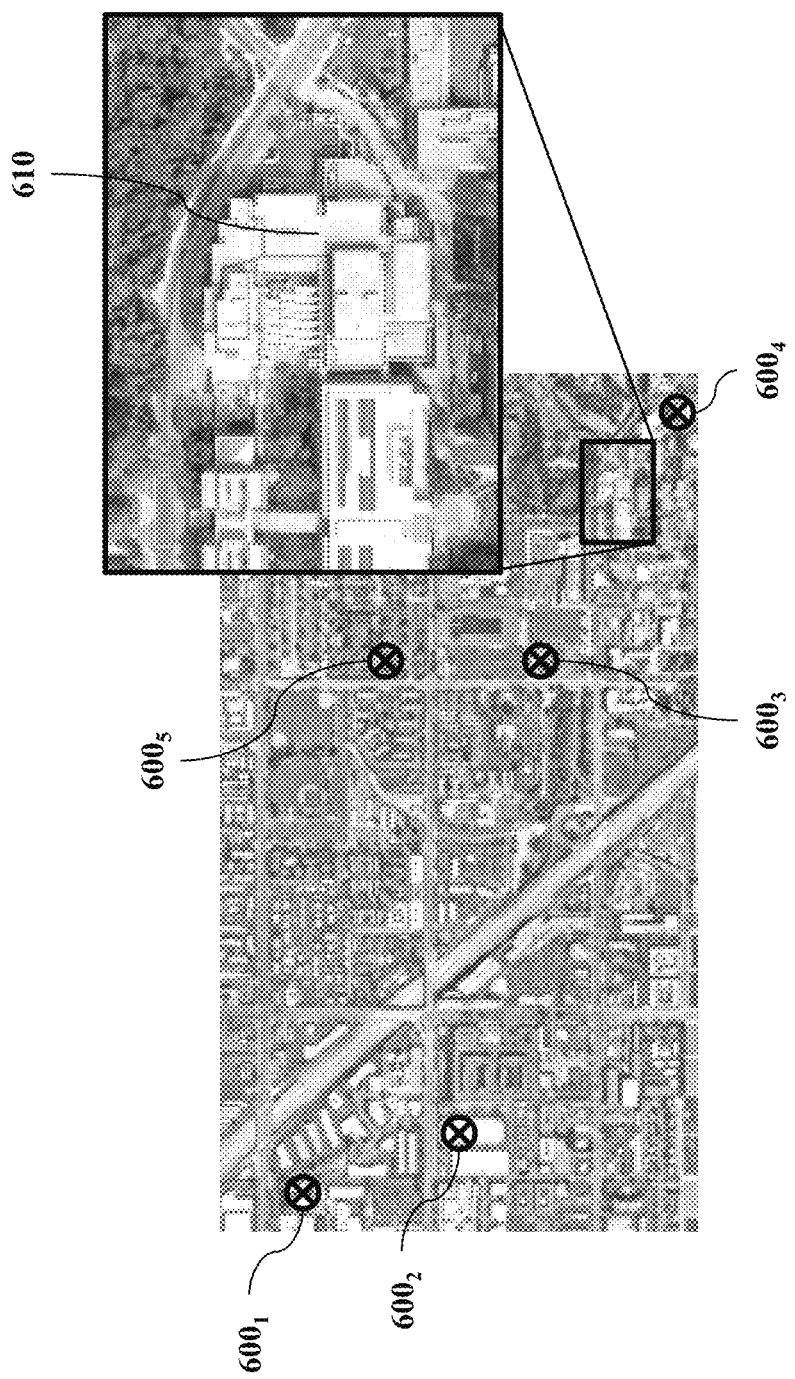
FIG. 6 is a graphical representation of a plurality of LTE eNodeBs according to one or more embodiments.

FIG. 6 is a graphical representation of a plurality of LTE eNodeBs according to one or more embodiments;

FIG. 6 shows the environmental layout of the experiment and the location of the eNodeBs $600_{1-5}$ to which the base receiver 610 (e.g., receiver 310) and navigator receiver (e.g., receiver 320) were listening.

Code Phase-Based Receiver vs. Carrier Phase-Based Receiver

Figure 7:
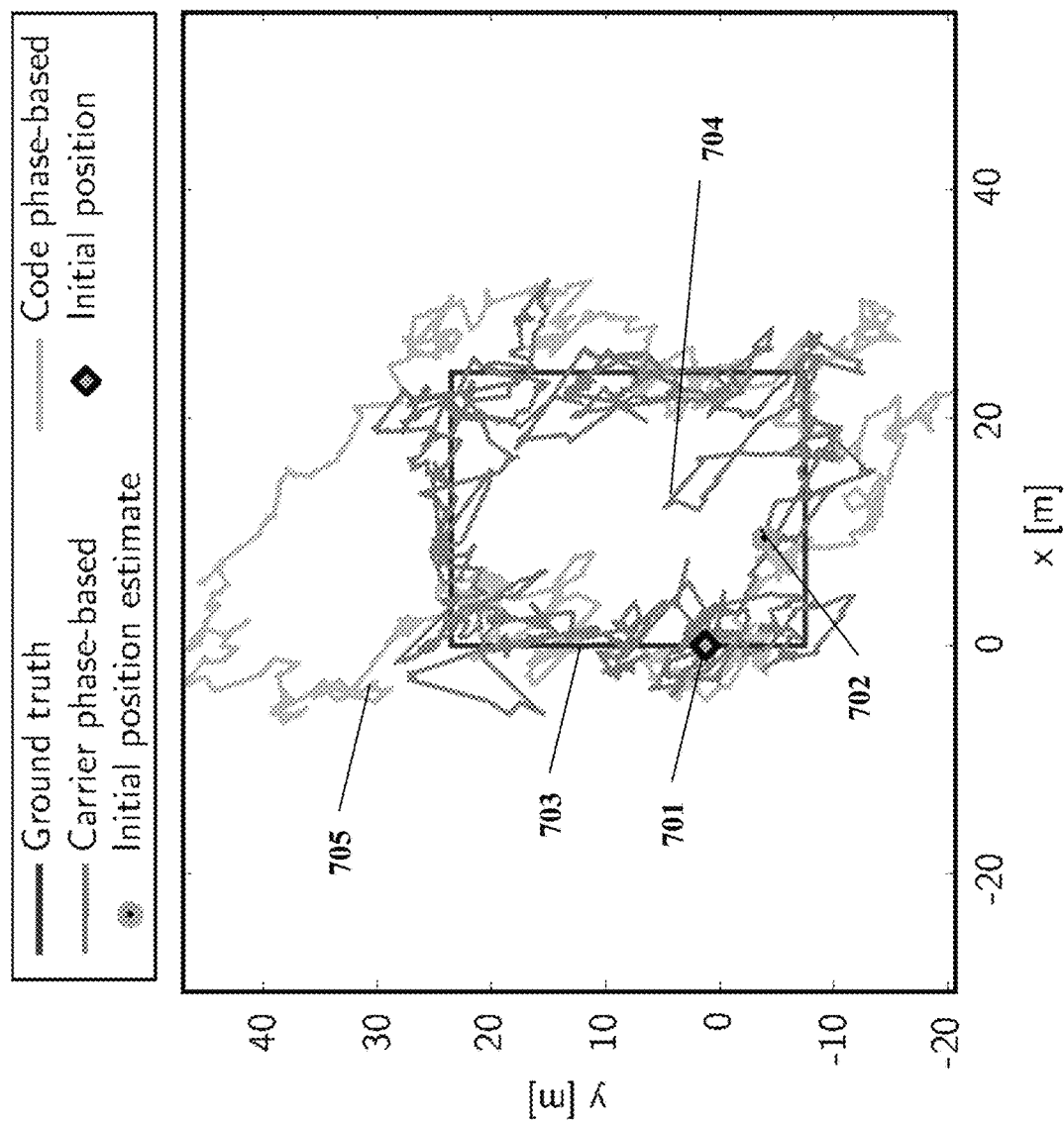
FIG. 7 illustrates navigator ground truth trajectory versus a standalone code phase-based receiver and a standalone code carrier phase-based receiver according to one or more embodiments.

FIG. 7 illustrates navigator ground truth trajectory versus a standalone code phase-based receiver and a standalone code carrier phase-based receiver according to one or more embodiments. FIG. 7 illustrates initial position 701 and initial position estimate 702. FIG. 7 also illustrates ground truth 703, carrier phase-based results 704 and code phase-based results 705.

The objective of this subsection is to compare the performance of the code phase-based receiver (e.g., receiver 100) and the carrier phase-based receiver (e.g., receiver 200). In one embodiment, the navigation observables of these two receivers were fed individually to an EKF to obtain their navigation solutions. The EKF used in this subsection did not use the IMU; instead, the EKF time-update used a velocity random walk dynamics. FIG. 7 shows the navigation solution for both receivers. The position RMSE of the carrier phase-based receiver was 5.09 m compared to 11.76 m for the code phase-based receiver.

It is worth noting the following remarks pertaining to the results presented in FIG. 7.

In an indoor environment, short-delay multipath propagation highly affects the received signal. Multipath propagation can induce meter-level error in the code phase measurement, while this error is less than a wavelength (i.e., centimeter-level) for the carrier phase measurements. This is consistent with the carrier phase-based receiver outperforming the code phase-based receiver.

In a carrier phase-based receiver, the integer number of cycles from the transmitter to the receiver is ambiguous and must be estimated. Several algorithms have been proposed to estimate integer ambiguities. In one experimental embodiment of this disclosure, code phase measurements are used to initialize the integer ambiguities. Due to the low precision of code phase measurements, the accuracy of this approach may be relatively lower as compared to other integer ambiguity estimation algorithms.

Multipath propagation can cause cycle slips in a carrier phase-based receiver which must be detected and removed in order to achieve a reliable and accurate performance. Cycle slip detection is out of the scope of this disclosure.

Filter Initialization

In one embodiment, the receiver's initial position and orientation are considered as the origin and orientation of the local frame in which the receiver's motion state is estimated. In one embodiment, the gyroscope's and accelerometer's biases were initialized by taking the mean of 30 seconds of IMU data while the receiver was stationary.

In one embodiment, the receiver's initial orientation, position, and velocity were initialized using a multivariate Gaussian random generator with a mean $\mathbb{E}\{[\hat{\theta}_z(0|0), \hat{r}^T(0|0), \hat{\dot{r}}^T(0|0)]\} = [0, 0, 0, 2.2, 0.2]$ and a covariance of $P(0|0) = \text{diag}[0.1, 100, 100, 10, 10]$.

In one embodiment, the receiver's clock bias $c\Delta\delta t$ and drift $c\Delta\dot{\delta} t$ were initialized using the receiver's initial position and two consecutive prior measurements. The initial clock bias and drift uncertainties were set to 1 m$^2$ and 0.1 (m/s)$^2$, respectively.

It is assumed that the receiver is equipped with a temperature-compensated crystal oscillator (TCXO); hence, in one embodiment, the values of $S_{\tilde{w}_{\delta t,i}}$ and $S_{\tilde{w}_{\dot{\delta} t,i}}$ were set to $4.7 \times 10^{-20}$ and $7.5 \times 10^{-20}$, respectively. In one embodiment, the measurement noise variance $\{\sigma_{i,u}^2\}_{u=1}^{U}$ for $i \in \{\text{nav}, \text{base}\}$ were set to $$\left\{c^2 \frac{a_u}{(C/N_0)_u}\right\}_{u=1}^{U},$$

respectively, where $(C/N_0)_u$ is the received carrier-to-noise ratio for the u-th eNodeB and $\{a_u > 0\}_{u=1}^{U}$ are tuning parameters that were chosen to be $\{5.56, 7.78, 3.33, 3.1, 3.78\} \times 10^{-12}$.

Navigation Results

Figure 8A:
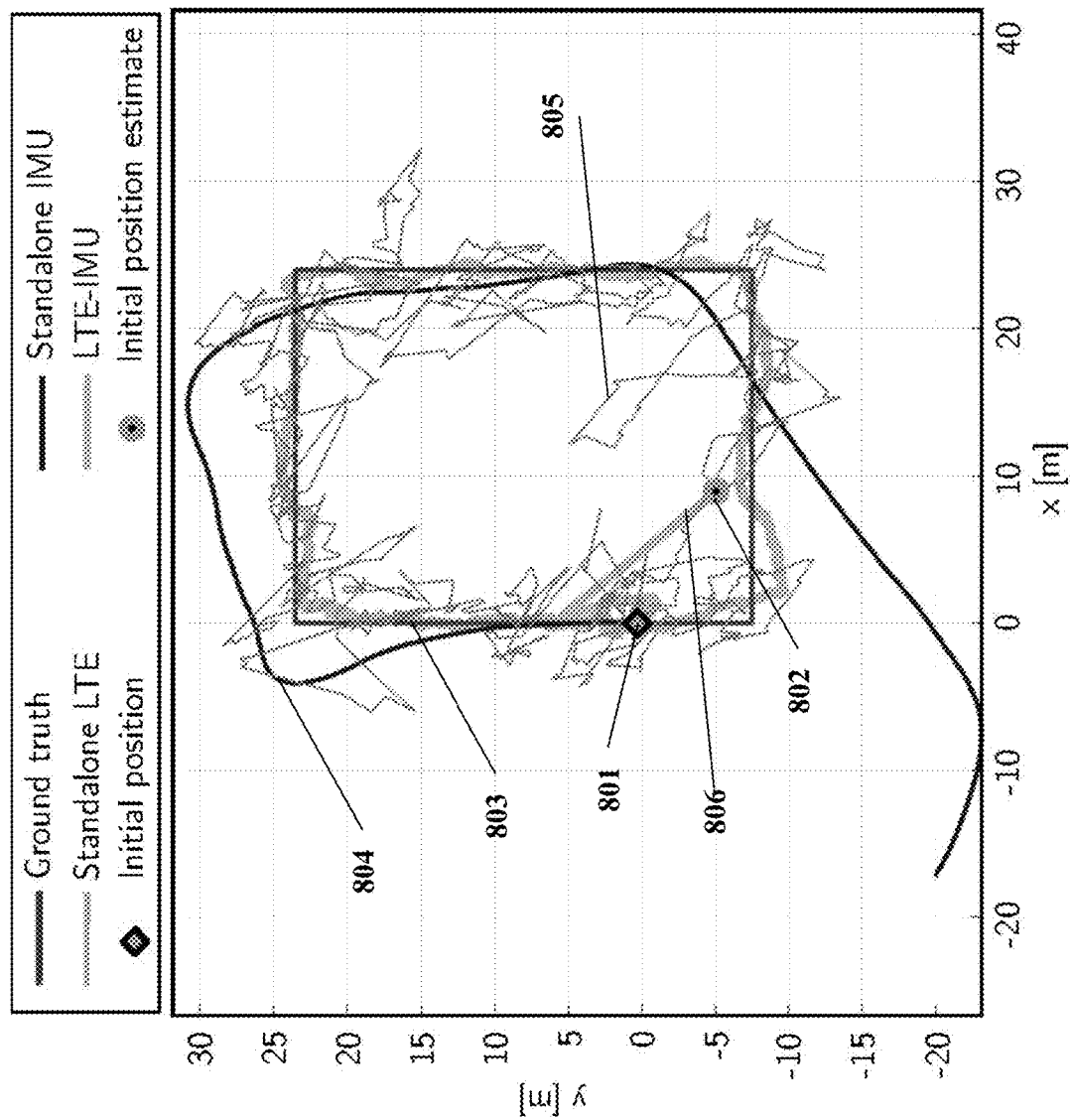
FIG. 8A illustrates navigator ground truth trajectory versus a navigation solution from IMU only, a standalone carrier phase-based LTE, and LTE-IMU according to one or more embodiments.

FIG. 8A illustrates navigator ground truth trajectory versus a navigation solution from IMU only, a standalone carrier phase-based LTE, and LTE-IMU according to one or more embodiments. FIG. 8A illustrates initial position 801 and initial position estimate 802. FIG. 8A also illustrates ground truth 803, standalone LTE results 805, standalone IMU 804 and LTE IMU results 806.

Figure 8B:
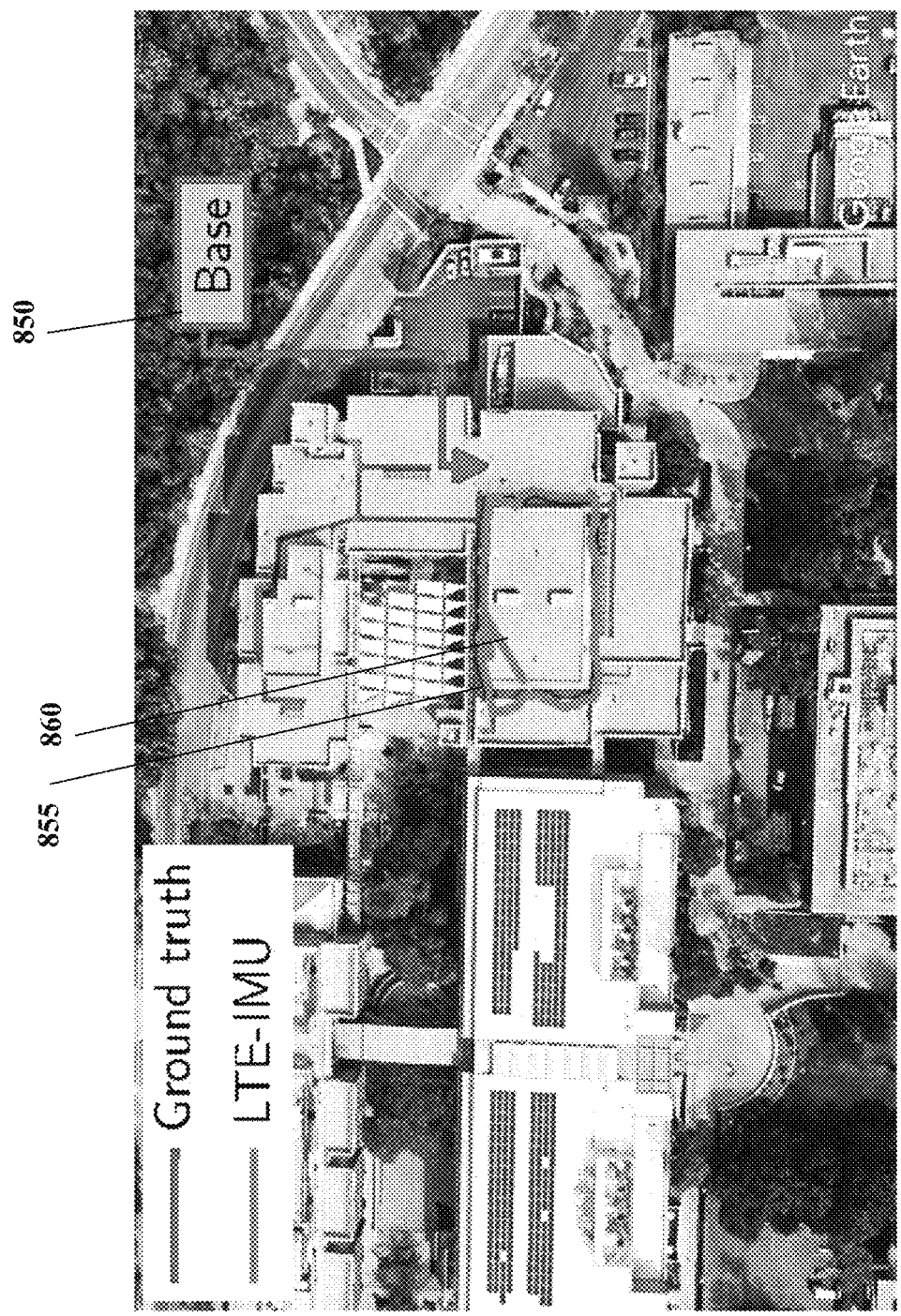
FIG. 8B illustrates navigator ground truth trajectory versus an LTE-IMU according to one or more embodiments.

FIG. 8B illustrates navigator ground truth trajectory versus an LTE-IMU according to one or more embodiments. FIG. 8B illustrates base 850, ground truth 855 and LTE-IMU results 860.

In this subsection, the performance of the proposed navigation framework is evaluated. Over the course of the experiment, the navigator receiver traversed a trajectory of 109 m, while the base was stationary. FIG. 8A shows the navigator's ground truth trajectory versus the navigation solution from experimental embodiments of: (1) IMU only, (2) standalone carrier phase-based LTE, and (3) LTE-IMU. FIG. 8B compares the navigation solution of the presented LTE-IMU framework versus the ground truth. Table II summarizes the experimental results.

TABLE II

INDOOR POSITIONING PERFORMANCE COMPARISON

| Performance Measure [m] | IMU Only | Standalone LTE | LTE-IMU |
|---|---|---|---|
| RMSE | 9.48 | 5.09 | 2.92 |
| Standard deviation | 10.36 | 5.66 | 2.74 |
| Maximum error | 22.53 | 14.24 | 5.60 |

Figures 9A, 9B:
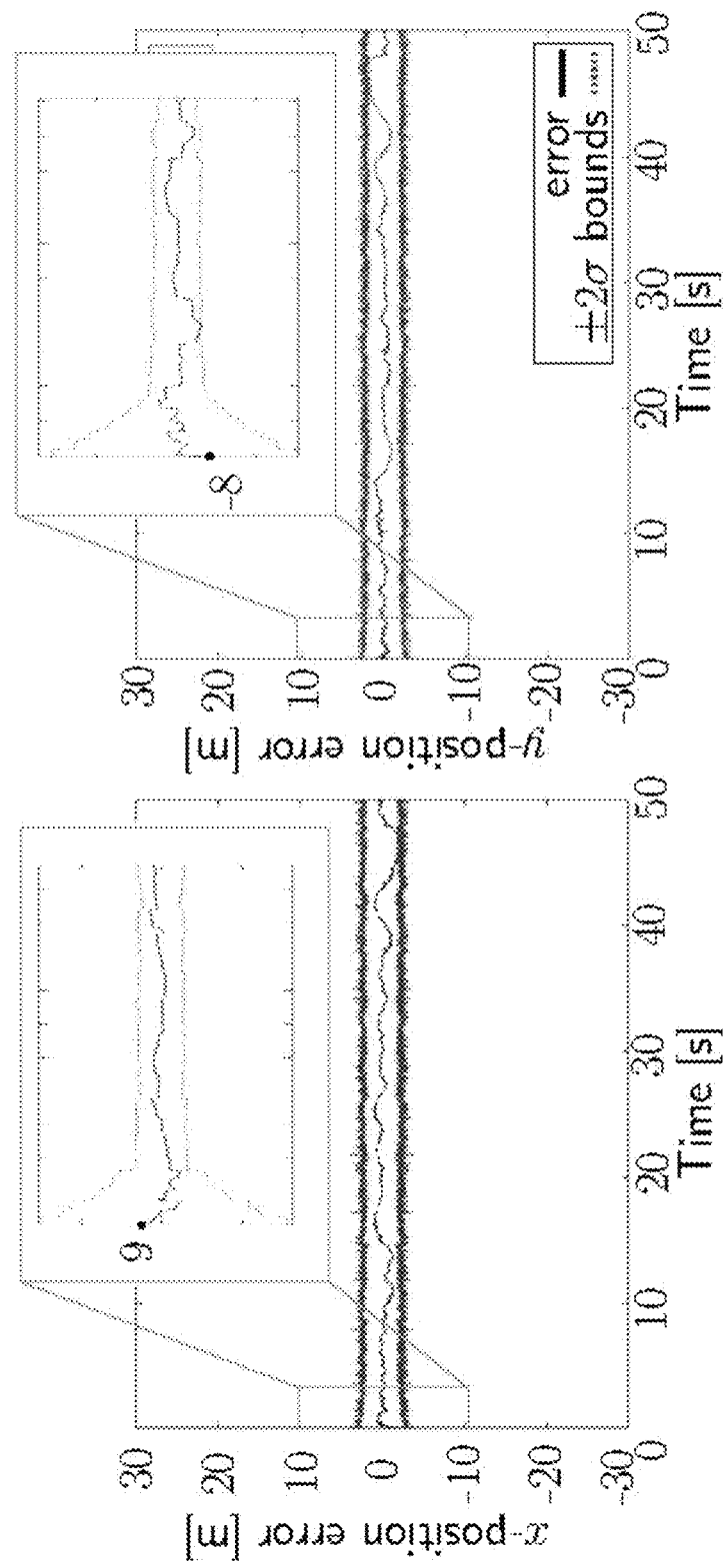
FIG. 9A illustrates an EKF estimation of the navigator's x-position according to one or more embodiments.
FIG. 9B illustrates an EKF estimation of the navigator's y-position along with the associated ±2σ bounds according to one or more embodiments.

FIGS. 9A-9B shows the EKF estimation error of the navigator's x-position (FIG. 9A) and y-position (FIG. 9B) along with the associated ±2σ bounds.

CONCLUSION

The experimental embodiments disclosed in this disclosure evaluated the performance of two different LTE receivers for indoor localization: (1) code phase-based receiver and (2) carrier phase-based receiver. The experimental results with real LTE signals in an indoor environment showed that the carrier phase-based receiver outperforms the code phase-based receiver with a position RMSE of 5.09 m versus 11.76 m. A base/navigator navigation framework was proposed to remove the effect of the unknown eNodeBs' clock biases. A tightly-coupled LTE-IMU system was presented to enable accurate indoor localization. The LTE-IMU navigation solution demonstrated a 2-D RMSE of 2.92 m and a maximum error of 5.6 m over 109 m trajectory. The 2-D position RMSE was improved by 69.2% when using the proposed LTE-IMU navigation framework compared to the IMU only solution.

While this disclosure has been particularly shown and described with references to exemplary embodiments thereof, it will be understood by those skilled in the art that various changes in form and details may be made therein without departing from the scope of the claimed embodiments.

What is claimed is:

1. A method for indoor localization for a navigator receiver, the method comprising:
   receiving, by a device, a broadband communication signal;
   processing, by the device, the broadband communication signal based on a receiver framework to estimate range of the device relative to a source of the broadband communication signal;
   receiving, by the device, position and psuedorange measurement data from a base receiver;
   receiving, by the device, inertial measurement unit (IMU) measurement data associated with the device;
   determining, by the device, a position for the device based on estimated range of the device relative to the source, difference in psuedorange measurement data relative to the base receiver, and IMU measurement data, wherein a filter of the device determines position based on a state vector for the device, a clock state vector and IMU state vector; and
   outputting, by the device, a navigation observable based on the position determined for the device.

2. The method of claim 1, wherein the broadband communication signal is a cellular long term evolution (LTE) signal and wherein a cell-specific reference signal (CRS) of the broadband communication signal is tracked to estimate the range of the device.

3. The method of claim 1, wherein the range estimate is determined based on a code based receiver framework including an operations to perform a coarse estimate of frame start time, estimation of channel impulse response, estimation of time of arrival and tracking symbol timing within a frame of a received signal.

4. The method of claim 1, wherein the range estimate is determined based on a carrier-based receiver framework including operations to perform a coarse estimate of frame start time, estimation of doppler frequency of received signal, phase tracking of a cell-specific reference signal (CRS), and estimation of time of arrival.

5. The method of claim 1, wherein receiving position and psuedorange measurement data from the base receiver includes receiving base position and base psuedorange measurements from a base device, wherein differences in psuedorange measurements are used by the device to remove clock bias from a received signal.

6. The method of claim 1, wherein receiving the IMU measurement data includes receiving angular rate around a z-axis and two-dimensional specific forces along x and y axes.

7. The method of claim 1, wherein determining position by the filter includes an operation to perform a discrete-time update of a clock state estimate for the device, wherein clock bias of the device is corrected.

8. The method of claim 1, wherein determining position by the filter includes updating a state vector for the device based on an extended Kalman filter (EKF) operation, the EKF filter operation updating the state vector to account for clock bias and the IMU state vector, and wherein the EKF filter operation fuses IMU data with device measurements.

9. The method of claim 1, wherein an extended Kalman filter (EKF) operation is performed to estimate a state vector from carrier phase measurements.

10. The method of claim 1, wherein the navigation observable is at least one pseudorange measurement between a navigating receiver and a source of the broadband communication signal, wherein output of a navigation filter includes two-dimensional position and velocity of the device, and estimates of receiver clock bias and drift.

11. A device configured for indoor localization, the device comprising:
   a receiver module configured to receive a broadband communication signal; and
   a controller coupled to the receiver module, wherein the controller is configured to process the broadband communication signal based on a receiver framework to estimate range of the device relative to a source of the broadband communication signal;
   receive position and psuedorange measurement data from a base receiver;
   receive inertial measurement unit (IMU) measurement data associated with the device;
   determine a position for the device based on estimated range of the device relative to the source, difference in psuedorange measurement data relative to the base receiver, and IMU measurement data, wherein a filter of the device determines position based on a state vector for the device, a clock state vector and IMU state vector; and output a navigation observable based on the position determined for the device.

12. The device of claim 11, wherein the broadband communication signal is a cellular long term evolution (LTE) signal and wherein a cell-specific reference signal (CRS) of the broadband communication signal is tracked to estimate the range of the device.

13. The device of claim 11, wherein the range estimate is determined based on a code based receiver framework including an operations to perform a coarse estimate of frame start time, estimation of channel impulse response, estimation of time of arrival and tracking symbol timing within a frame of a received signal.

14. The device of claim 11, wherein the range estimate is determined based on a carrier-based receiver framework including operations to perform a coarse estimate of frame start time, estimation of doppler frequency of received signal, phase tracking of a cell-specific reference signal (CRS), and estimation of time of arrival.

15. The device of claim 11, wherein receiving position and psuedorange measurement data from the base receiver includes receiving base position and base psuedorange measurements from a base device, wherein differences in psuedorange measurements are used by the device to remove clock bias from a received signal.

16. The device of claim 11, wherein receiving the IMU measurement data includes receiving angular rate around a z-axis and two-dimensional specific forces along x and y axes.

17. The device of claim 11, wherein determining position by the filter includes an operation to perform a discrete-time update of a clock state estimate for the device, wherein clock bias of the device is corrected.

18. The device of claim 11, wherein determining position by the filter includes updating a state vector for the device based on an extended Kalman filter (EKF) operation, the EKF filter operation updating the state vector to account for clock bias and the IMU state vector, and wherein the EKF filter operation fuses IMU data with device measurements.

19. The device of claim 11, wherein an extended Kalman filter (EKF) operation is performed to estimate a state vector from carrier phase measurements.

20. The device of claim 11, wherein the navigation observable is at least one pseudorange measurement between a navigating receiver and a source of the broadband communication signal, wherein output of a navigation filter includes two-dimensional position and velocity of the device, and estimates of receiver clock bias and drift.

* * * * *